US012088234B2

(12) United States Patent
Todorov et al.

(10) Patent No.: US 12,088,234 B2
(45) Date of Patent: Sep. 10, 2024

(54) DRIVING OF A SINGLE COIL BRUSHLESS DC MOTOR

(71) Applicant: Melexis Bulgaria EOOD, Sofia (BG)

(72) Inventors: Dimitar Todorov, Sofia (BG); Dirk Leman, Tessenderlo (BE)

(73) Assignee: MELEXIS BULGARIA EOOD, Sofia (BG)

( * ) Notice: Subject to any disclaimer, the term of this patent is extended or adjusted under 35 U.S.C. 154(b) by 343 days.

(21) Appl. No.: 17/552,065

(22) Filed: Dec. 15, 2021

(65) Prior Publication Data

US 2022/0190755 A1    Jun. 16, 2022

(30) Foreign Application Priority Data

Dec. 16, 2020 (EP) ..................................... 20472017

(51) Int. Cl.
    *H02P 6/10*     (2006.01)
    *H02P 6/182*    (2016.01)
    *H02P 6/26*     (2016.01)

(52) U.S. Cl.
     CPC ............... *H02P 6/10* (2013.01); *H02P 6/182* (2013.01); *H02P 6/26* (2016.02)

(58) Field of Classification Search
     CPC .... H02P 6/10; H02P 6/182; H02P 6/26; H02P 6/18; H02P 6/28; H02P 6/157
     See application file for complete search history.

(56) References Cited

U.S. PATENT DOCUMENTS

| 5,130,620 A * | 7/1992 | Inaji ........................ H02P 6/085 318/400.35 |
| 2005/0218849 A1 | 10/2005 | Sanglikar et al. |
| 2006/0214611 A1* | 9/2006 | Wang ....................... H02P 6/182 318/400.34 |
| 2010/0251511 A1* | 10/2010 | Clothier ................ A47L 9/2889 318/400.14 |

(Continued)

FOREIGN PATENT DOCUMENTS

EP    3425788 B1    6/2020

OTHER PUBLICATIONS

Search Report and Written Opinion from corresponding European Application No. EP20472017.1, Apr. 20, 2021.

*Primary Examiner* — Bickey Dhakal
(74) *Attorney, Agent, or Firm* — Workman Nydegger (57) ABSTRACT

A method for controlling a single coil BLDC motor having an electrical time constant, the method includes EHP sequences having a pulse train with at least two driving pulses of a same polarity, each driving pulse comprises: applying a driving signal during a torque generating period (TGP), followed by a non-torque generating period (NTGP); monitoring the phase current, wherein the sensing window lasts at least during a time constant, which is the electrical time constant or an approximation thereof, if the sensing window is during the TGP, and wherein the sensing window minimally lasts until the phase current has reduced to less than half the maximum phase current which was generated during the TGP if the sensing window is during the NTGP; determining parameters for the ongoing EHP, and/or for at least one next EHP sequence based on the obtained phase current information.

16 Claims, 7 Drawing Sheets

(56) References Cited

U.S. PATENT DOCUMENTS

| | | | |
|---|---|---|---|
| 2012/0081050 A1* | 4/2012 | Dai | H02P 6/15 |
| | | | 318/400.14 |
| 2013/0234631 A1* | 9/2013 | Bateman | H02P 6/185 |
| | | | 318/400.01 |
| 2016/0118916 A1* | 4/2016 | Gohara | H02P 6/34 |
| | | | 318/400.38 |
| 2017/0288589 A1* | 10/2017 | Sato | H02P 6/085 |
| 2020/0127587 A1 | 4/2020 | Roemmelmayer et al. | |

* cited by examiner

DRIVING OF A SINGLE COIL BRUSHLESS DC MOTOR

FIELD OF THE INVENTION

The present invention relates to methods and systems for controlling a single coil brushless DC motor. More specifically it relates to sensor less control of brushless DC motors.

BACKGROUND OF THE INVENTION

State of the art 1-coil fan drivers today typically use Hall sensors for rotor position detection and commutation control.

In order to avoid the need for a Hall sensor, sensorless commutation methods are developed. Such sensorless methods may for example monitor the BEMF (back electromotive force) voltage for estimating the position of the rotor. Sensorless methods make the motor construction less complex, because the hall sensor position is critical for the operation of Hall based commutation. In low-cost high volume fan systems such as they are used for CPU cooling, refrigerator ventilation, power converter cooling, etcetera, but also in low cost pumps to displace liquids, single coil fans, based on hall sensing are applied. In case in such low-cost systems the hall sensor could be avoided, it is clear, that the single coil motor controller may no longer have to be applied close to the rotor, or even not inside the motor assembly, for instance a fan or pump, anymore. In current low-cost systems remote controllers typically use PWM input signals, and FG/RD output pins, as communication interface to control the fandrivers which are integrated into the remote fan. In case of sensorless control, a significant system simplification can be achieved by locating the fandriver close to the controller, or even integrate into the remote controller.

Some prior art methods for sensor less control adjust the driving method, to allow sensing. For instance, by putting the output driver stage to high impedance, the BEMF voltage, that is induced in the stator coil, becomes visible as a voltage. Or by changing the driver stage to freewheeling, the influence of the BEMF voltage on the stator coil current can be analyzed, in order to derive the BEMF voltage zero crossing information. Freewheeling may for example be achieved by having both half bridges low or both half bridges high. Freewheeling can also be done with 1 FET active and the other FET off. In such case the body diode must be off. The BEMF voltage zero crossing is then used as input of the rotor position and the rotor speed, to allow motor control.

One of the main challenges for sensor less motor control is to define a reliable start up. Whereas for drivers using Hall sensors, the driving of the motor is never masking a sensing aspect for a current or a voltage, this is not the case for sensor less drivers where the driving of the motor may mask a sensing aspect for a current or a voltage, which might be needed to be derived during the motor control.

In view of these problems there is a need for good, preferably sensorless, devices and methods for starting a single phase/single coil BLDC motor.

SUMMARY OF THE INVENTION

It is an object of embodiments of the present invention to provide good methods and devices for driving a single coil brushless DC motor. It is an advantage of embodiments of the present invention that no Hall sensor is required for commutation control.

The above objective is accomplished by a method and device according to the present invention.

In a first aspect embodiments of the present invention relate to a method for controlling a single coil brushless DC motor having an electrical time constant. The method comprises EHP sequences which comprise a pulse train which comprises at least two driving pulses of a same polarity.

Each driving pulse comprises:
applying a driving signal during a torque generating period (TGP), to increase a phase current, followed by a non-torque generating period (NTGP), during which the phase current is reducing,
monitoring the phase current during a sensing window thereby obtaining phase current information, wherein the sensing window lasts at least during a time constant, which is the electrical time constant or an approximation of the electrical time constant, if the sensing window is during the TGP, and wherein the sensing window minimally lasts until the phase current has reduced to less than half the maximum phase current which was generated during the TGP if the sensing window is during the NTGP,
and determining parameters for the ongoing EHP, and/or for at least one next EHP sequence based on the obtained phase current information.

In a second aspect embodiments of the present invention relate to a device for driving a single coil brushless DC motor, the device comprising:
a driver configured for driving the single coil brushless DC motor in accordance with a method according to any of the previous claims,
a current monitoring module configured for monitoring the phase current in accordance with a method according to any of the previous claims thereby obtaining phase current information,
wherein the device is configured for determining parameters for the ongoing EHP or for a next EHP sequence based on the obtained phase current information.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to an electrical half period (EHP), reference is made to a period of 180 electrical degrees.

Figure 1:
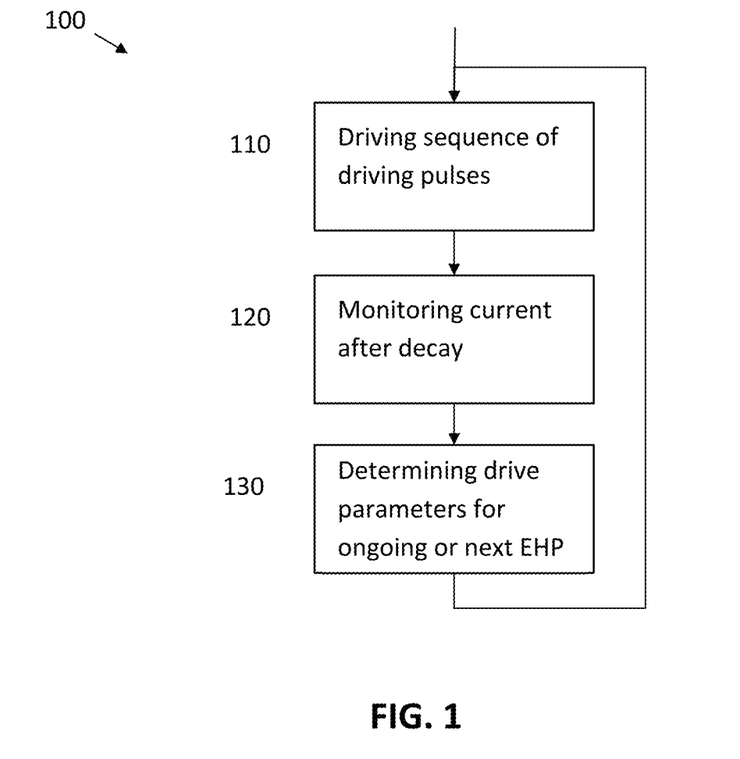
FIG. 1 shows an exemplary flow chart of a method in accordance with embodiments of the present invention.

In a first aspect embodiments of the present invention relate to a method 100 for controlling a single coil brushless DC motor having an electrical time constant. An exemplary flow chart of such a method is shown in FIG. 1.

The electrical time constant may be the electrical time constant of the complete system (e.g., caused by the motor, the driver electronics, and their integration on a PCB) or of the motor only. The electrical time constant may be expressed as i=Ltotal/Rtotal and may comprise the motor time constant motor=Lcoil/Rcoil, wherein Lcoil is the coil inductance and Rcoil is the coil resistance. Next to Rcoil, Rtotal may also comprise Rdriver, the resistance of the High Side+the low Side FET, and any other resistance that influence the peak current that can be achieved for a given DC voltage which is applied on the motor, such as the wiring resistance or an optional shunt resistance. Next to Lcoil, Ltotal may comprise any inductance which might influence the total inductance, such as wiring inductance. It may also comprise additional electrical time constant induced by the driver electronics. In the method EHP sequences are used which comprise a pulse train which contains at least two driving pulses of a same polarity. Each driving pulse comprises:

applying 110 a driving signal during a torque generating period (TGP), to increase a phase current, followed by a non-torque generating period (NTGP), during which the phase current is reducing, monitoring 120 the phase current during a sensing window thereby obtaining phase current information, wherein the sensing window lasts at least during a time constant, which is the electrical time constant or an approximation of the electrical time constant, if the sensing window is during the TGP, and wherein the sensing window minimally lasts until the phase current has reduced to less than half the maximum phase current which was generated during the TGP if the sensing window is during the NTGP, and determining 130 parameters of the ongoing EHP, and/or at least one next EHP sequence based on the obtained phase current information.

As will be explained further in the description, the time constant may be a fixed value approximating the electrical time constant. It may for example be the minimum, maximum, or average of the electrical time constant. In some embodiments the time constant may be substantially the same as the electrical time constant.

It is an advantage of embodiments of the present invention that they provide an improvement over existing sensor less solutions for controlling single coil BLDC motors in order to allow a wider application range. In particular starting up sensorless motors from stand-still is challenging as for the very first EHP no prior speed information is available in order to predict when the first BEMF zero crossing (ZC) will occur, or for the subsequent EHPs the speed may be changing very rapidly, depending on load, motor inertia and applied torque as no steady state condition is present.

In embodiments of the present invention a method is provided, referred to as the pulse train method, to continuously scan if a BEMF ZC has occurred, without the need for prior speed information, and with sufficient resolution in order to prepare the transition to possible other sensorless methods, which may be more suitable for realizing low noise motor control, or more suitable to optimize the motor efficiency, etc. Such subsequent methods can benefit from the speed information obtained during the preceding pulse train method.

In embodiments of the present invention the sensing window minimally lasts until the phase current has reduced to less than half the maximum phase current which was generated during the TGP. In some embodiments the phase current may even decay to less than 80% or even less than 99% of the maximum phase current which was generated during the TGP preceding the NTGP. In embodiments of the present invention the phase current may even reduce to below zero (meaning the current inversed). In that aspect reducing of the current also covers an increasing negative current.

In order to obtain a substantial decay of the current, the sensing window must be sufficiently large. The decay time may for example be substantially longer than the typical PWM period (e.g., of at least 40 μs), as typically applied in PWM-based motor control. Typically, the decay lasts at least one L/R-time constant of the motor (τ), such as 50 μs, or 200 μs, or 500 μs, or 1 ms or 5 ms, or 10 ms. This may result in a pulsating drive train in the audible frequency range. Therefore such a method is preferably applied only for applications where the motor starts up quickly, such that it remains in the pulsetrain method no longer than 100 ms, or 500 ms or 1 sec or 5 sec, depending on how critical acoustic noise performance is to the end user.

An alternative is to apply "hard or active braking" which pushes current from the coil directly into the supply, instead of applying recirculation. In this case, the decay period may be achieved in less than one electrical time constant τ.

In embodiments of the present invention a pulse train comprises at least two driving pulses. Driving at least 2 pulses means that there should be at least 2 generator mode periods in which the phase current information in one sensing window can be compared to the phase current information obtained in another sensing window. This comparison may be between successive driving pulses, or the monitoring may be interleaved or any other combination. Monitoring every sensing window is preferred as this results in the highest resolution, and the highest response time to capture the BEMF zero crossing moment.

It is an advantage of embodiments of the present invention that the phase current information obtained during the freewheeling period, after a substantial decay of the current, can be used as a measure for the BEMF voltage. Thus, it is for example possible to estimate a zero crossing moment of the BEMF voltage which is an indication for the rotor position. Hence, this phase current information can be used for determining parameters for a next EHP sequence.

In embodiments of the present invention, a pulse train is applied in which the driving periods as well as the sensing windows are limited to a time which is substantially shorter than the time for reaching the first commutation point. Hence, a higher accuracy in detecting the BEMF zero crossing can be obtained than with a single pulse. Also, a sufficient amount of startup torque can be realized.

In embodiments of the present invention 2 or more driving pulses are applied within an EHP. The more pulses are applied, the higher the resolution.

In embodiments of the present invention the driving pulse is strong enough to generate substantial torque to move the rotor from its low torque starting position, and to cross each zero torque position, and overcome the reluctance torque ripple in each EHP. This may be realized by the applied duty cycle, and/or by the applied current limit, and/or by the applied pulse width until the rotor moves.

Figure 3:
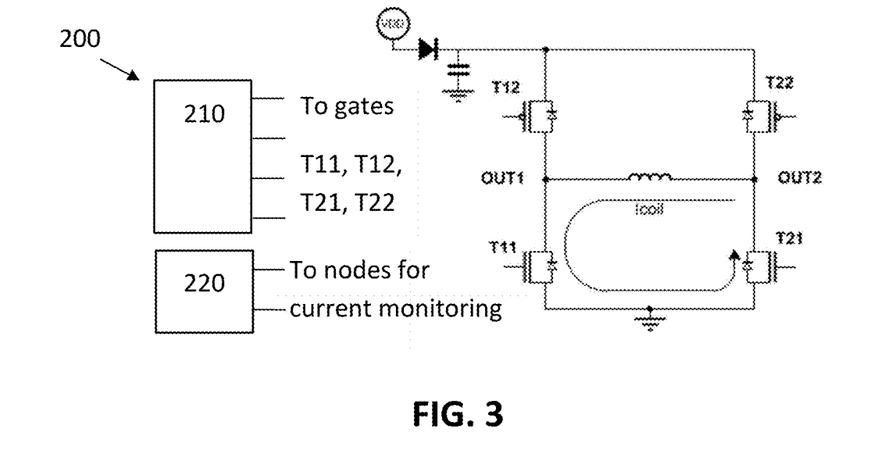
FIG. 3 shows a schematic drawing of a device 200 in accordance with embodiments of the present invention for driving a single coil BLDC motor.

In a second aspect embodiments of the present invention relate to a device 200 for driving a single coil brushless DC motor. The device comprises:
- a driver 210 configured for driving the single coil brushless DC motor in accordance with a method according to embodiments of the present invention,
- a current monitoring module 220 configured for monitoring the phase current in accordance with a method according to embodiments of the present invention, thereby obtaining phase current information.

The device 200 is configured for determining parameters for the ongoing EHP or for a next EHP sequence based on the obtained phase current information.

In embodiments of the present invention the driver may comprise a full bridge realized by at least 4 transistors, which are able to apply the driving signal during TGP and NTGP.

Figure 2:
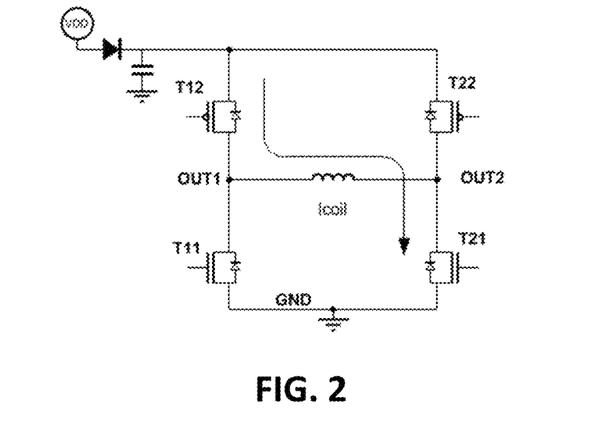
FIG. 2 shows a schematic drawing of a full bridge driver for driving a single coil BLDC motor.

FIG. 2 shows a schematic drawing of such a full bridge driver for driving a single coil BLDC motor. This drawing shows the current direction during TGP, with High Side Field Effect Transistor (FET) on OUT1 and Low side FET on OUT2 active.

FIG. 3 shows a schematic drawing of a device 200 in accordance with embodiments of the present invention for driving a single coil BLDC motor. The device 200 comprises a driver 210 configured for driving the single coil BLDC motor. In this example the driver 210 is configured for driving the gates of the transistors of the full bridge driver (also shown in the figure). Also, the current monitoring module is schematically shown in FIG. 3. In embodiments of the present invention the NTGP comprises a recirculation period (RP). The coil current in FIG. 3 shows an example of recirculating current on the low side FETs during the RP. In this example Low Side FET T11 on OUT1 is active. Either T21 may be active, or the recirculation current may flow through the body diode of T21. Alternatively, the recirculation current may flow in the opposite direction, then T21 is active, and T11 may be active, or the current may flow through the body diode of T11.

In similar way recirculation can also be done through both high side FETs.

Figure 4:
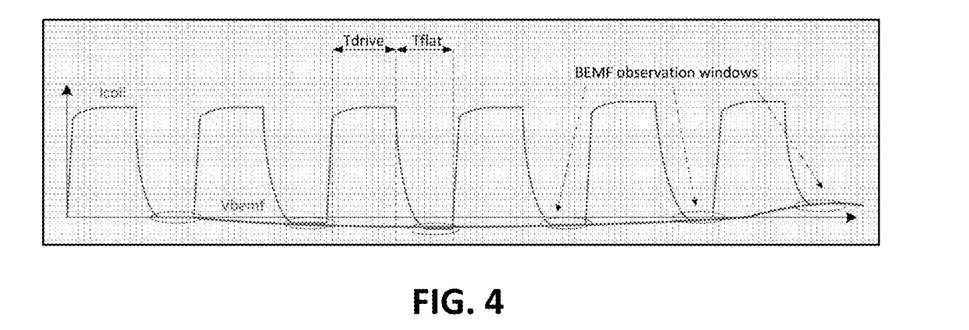
FIG. 4 shows a theoretical representation on how the BEMF shape is reflected into the recirculating coil current during the application of a pulse train in accordance with embodiments of the present invention.

FIG. 4 shows a theoretical representation on how the BEMF shape is reflected into the recirculating coil current (Icoil) during the application of a pulse train. During the recirculation period the phase current is left to decay.

The recirculation period, optionally, may comprise at least one reverse current period (RCP) during which the phase current decay is accelerated. For applications where the electrical time constant is so high compared to the duration of the first EHP sequence, that no 2 driving pulses would be possible by relying on the natural decay of the phase current, a short interleaving reverse current pulse (hard or active braking) may be applied to accelerate the discharging of the coil current.

In embodiments of the present invention the pulse train comprises at least 3 pulses.

It is an advantage of embodiments of the present invention that the pulse train comprises at least 3 pulses. Compared to 3 pulses, 2 pulses will result in a larger worst case error as during the TGP (torque generating period) the control is "blind", and the TGP is a substantial part if the EHP has only 2 periods, or the TGP is short with proportionally very long RP (recirculation period). While recirculation is in practice also braking, this is not preferred to ensure the motor does not slow down and stop.

In a method according to embodiments of the present invention the torque is smoothened, and the sensing resolution is increased by reducing the pulses and/or by reducing the sensing windows.

In embodiments of the present invention the first pulse is initiated while the motor is standing still.

A method according to embodiments of the present invention is particularly advantageous when it is applied during the first commutations from start-up as it allows a robust start up. At start up robust control is more important than noise performance. The method may also be applied during steady state operation, but this may result in an increased noise compared to other methods. Therefore, in some embodiments of the present invention the control of the motor may be switched to another method once the motor is started.

In embodiments of the present invention the determining step comprises comparing a shape of the obtained phase current of subsequent sensing windows.

In embodiments of the present invention the determining step comprises comparing a shape of the obtained phase current information of subsequent sensing windows.

In embodiments of the present invention the driving signal during the TGP is a driving voltage wave form which is defined by a permanent high signal, or has a predefined shape.

In embodiments of the present invention the voltage wave form may be defined using a pulse width modulation (PWM) of the supply voltage, which may be limited by a current limiting signal, which may cut the PWM duty cycle when a predefined phase current level has been reached.

In embodiments of the present invention an average motor voltage in subsequent driving pulses is gradually increased. The average motor voltage is the average voltage difference over the coil generated by the motor driver over a certain period of time. In a PWM driving method, the voltage is provided in a time interrupted way resulting in an average voltage difference over the coil.

In case the driving voltage is defined with PWM control, this can be done by increasing the TGP and keeping the NTGP constant, or by keeping the TGP constant, and reducing the NTGP, or any combination thereof. The average motor voltage may be increased by increasing the PWM DCout during the TGP.

Increasing the average motor voltage may be done to realize a soft start, in order to realize an acceleration of the motor, or to increase the start up torque to overcome initial friction.

In embodiments of the present invention the NTGP comprises a recirculation period (RP).

In embodiments according to the present invention the time constant, which is the electrical time constant or an approximation thereof, is defined in function of a certain electrical position of the rotor, prior to the application of the first pulse train. Thus, a time constant may be obtained which is substantially the same as the electrical time constant.

Figure 9:
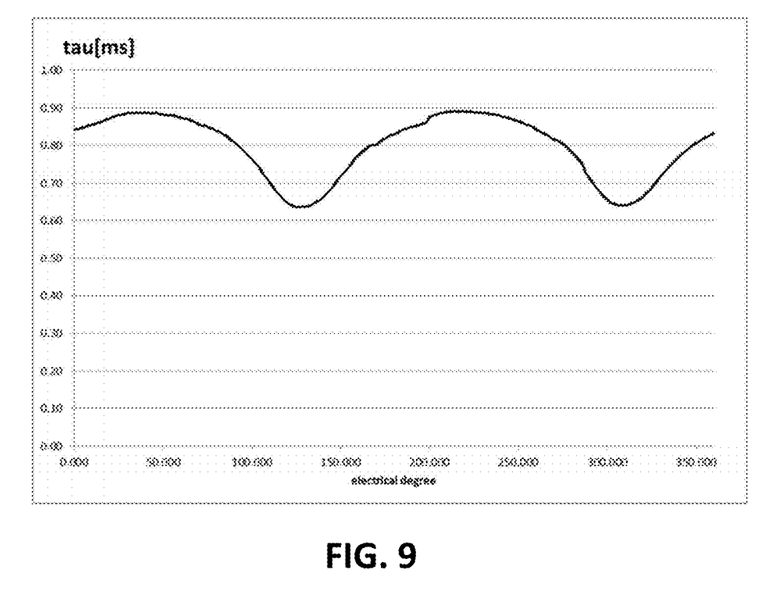
FIG. 9 shows the measurement result of the electrical time constant as function of the electrical position of the rotor.

The time constant may be predefined such that it is available prior to the application of the first pulse train. The time constant (and possibly also other information) may for example be provided with external components, or stored in EEPROM, or provided through a communication interface. When the time constant is varying in function of the position of the rotor, it may be defined as a fixed value $\tau 0$ at a reference point, combined with a mapping of the shape $k(x)$ as function of the electrical degree: $\tau(x)=k(x)*\tau 0$. $\tau 0$ may be the electrical time constant at a reference position of the electrical rotor. An exemplary graph of the electrical time constant as function of the position x of the rotor is shown in FIG. 9, and will be explained in more detail later in the description.

In embodiments of the present invention the NTGP may be the equal to the RP (so no reverse current). In embodiments of the present invention the NTGP may be fixed as a function of the time constant $\tau$. In case the electrical time constant is described as a variable in function of the position, also the NTGP may scale as a function of the time constant, based on a presumed rotor position, for instance based on information obtained through previous commutations, or other position or timing information available at the start of the pulse train.

In embodiments of the present invention the sensing window may be during the NTGP, and the NTGP may comprise a recirculation period which may be interrupted a predefined time after the phase current information has been obtained. The recirculation period may be limited by a predefined timeout value which is proportional to the electrical time constant, in case no negative phase current is detected within this timeout value.

By interrupting the recirculation period, a predefined time (e.g. immediately) after the phase current information has been obtained, the NTGP can be interrupted and the resolution can be kept maximum.

The phase current information may for example be the zero current crossing detection.

In embodiments of the present invention in which the NTGP comprises a recirculation period RP, the RP may for example be around 3 times the electrical time constant. This ensures the phase current to drop at least 95%. The presence of BEMF will further accelerate the decay of the phase current. Therefore RP>3*$\tau$, may be used as a minimum recirculation period to ensure the current to drop to substantially zero, and allow the BEMF to induce generator mode current. This minimum recirculation period may for example be used for small BEMF values at low speeds such as during the first EHP after start up. In embodiments of the present invention RP=4*$\tau$ is a typical value, RP=5*$\tau$ is more safe to take temperature drift effects into account as well. Bigger RP are possible, but will result in a loss of resolution.

In an exemplary embodiment of the present invention the time constant may be expressed in function of the position x (expressed in electrical degrees) of the rotor. It may be expressed in function of $\tau 0$ and x, wherein $\tau 0$ may be close to the maximum of $\tau(x)$ (see FIG. 9 in which i is illustrated in function of the position of the rotor expressed in electrical degrees). In that case $4*\tau 0$ is typically a safe value to set as RP, to ensure a current zero crossing detection over all positions.

In some embodiments of the present invention the time constant which is used may be the average electrical time constant. Alternatively, the minimum electrical time constant or the maximum electrical time constant may be used as time constant.

In embodiments of the present invention the sensing window is during the NTGP, and the NTGP comprises a recirculation period wherein during at least one recirculation period the phase current decays below a predefined current threshold, and as soon as one driving pulse with a recirculating phase current below the predefined threshold is detected, the determining step comprises determining the at least one next driving pulse in which the phase current is no longer dropping below the predefined threshold.

A motor driver according to embodiments of the present invention may comprise a controller for executing the determining step.

In embodiments of the present invention the predefined threshold may be defined in a EEPROM memory, or may be configured with external components, or be communicated through a communication interface.

In embodiments of the present invention the predefined threshold may have been defined during previous driving pulses which are used to characterize the motor parameters.

If the threshold is an adaptive threshold, it may be established in an empirical way (e.g. by comparing the same current at the same time location).

If the threshold is predefined it may be defined up front, or calculated from relevant motor parameters such as the system time constant, which is dominated by the electrical time constant of the motor, and which may be represented by $\tau 0$, and a characterization of a representative motor.

The predefined threshold may also be defined as a % compared to the peak current in the torque generating period. Such % may be adjusted from driving pulse to driving pulse to compensate for variation of the induction L as function of the position in the rotation. In typical implementations according to embodiments of the present invention, the threshold is a current threshold. The current threshold may for example be 0A. To drop below substantially 0A within 3 $\tau 0$, the BEMF must be present. In more advanced implementations in which the current does not have the time to decay to zero, a more intelligent approach is needed, as the actual inductance value, the size of the BEMF and the initial peak current value all influence the current at a given reference time. In an exemplary embodiment of the present invention, a timeout value $3*\tau(x)$ may be applied to maximize the resolution of the method. In a basic implementation the time constant $\tau(x)$ may be set identical to $\tau 0$. In more advanced methods the time constant $\tau$ may be varied according to a predicted timing within the EHP, in which a presumed angular position is derived from speed and time information, allowing to calculate x and apply the corresponding time constant $\tau(x)$ for each falling pulse.

In preferred implementations of this invention which are applied during start up, time constant $\tau 0$ is applied as it may be difficult to accurately predict the rotor position within the EHP due to fast acceleration.

In embodiments of the present invention the predefined current threshold is substantially zero.

During the torque generating period (TGP), any variation in the level of the supply voltage, and any variation of the inductance as function of the position of rotor L(x), influence the phase current value, and therefore also influence the absolute value of the initial phase current at the start of the recirculation phase. However this initial peak value does not influence the time for the phase current to drop below zero (i.e. generator mode current). Since the current can only drop below zero into generator mode due to the presence of BEMF.

If the predefined current thresholds is specified above 0, then a supply ripple and L(x) variations may have to be taken into account to avoid false conclusions.

In embodiments of the present invention determining parameters for the ongoing EHP sequence comprises defining the end of the ongoing EHP.

In embodiments of the present invention the end of the ongoing EHP is defined by initiating a next pulse train with the opposite polarity.

In embodiments of the present invention the end of the ongoing EHP may be defined by initiating a first commutation using another control method. Once the motor is rotating, it may be better to swap to another method for driving the motor (e.g., a less noisy method).

In embodiments of the present invention determining parameters for the next EHP sequence comprises defining a timeout window for the next EHP, and defining a range for the torque to be applied during the next EHP. In embodiments of the present invention the driving may for example be such that the average torque is within this range. In embodiment of the present invention instead of a range, a desired average torque may be determined for the next EHP.

For smooth transitions, the average torque should vary as little as possible. The average torque during the pulse train can be in first order approximated by the ratio between TGP and NTGP. The equivalent duty cycle of TGP and NTGP may be calculated as DCout_equiv=TGP/(TGP+NTGP). In case a fixed duty cycle DCout is applied during TGP, the average torque may be approximated by DCout_equiv=DCout*TGP/(DCout*TGP+NTGP). If TGP is increased gradually and NTGP is kept at a minimum value, the average torque may be taken from the last pulse, or from a calculated average of the at least last 2 pulses. If the NTGP is not fixed, the torque may have to be calculated real time, in order to define an applicable duty cycle for a next motor control method.

In embodiments of the present invention the end of the ongoing EHP may be followed by initiating a commutation using another EHP based on a different algorithm, when the number of pulses in the ongoing EHP is less than a predefined number of pulses. The predefined number of pulses may for instance be 2 pulses, 3 pulses, 5 pulses, etc. The different algorithm may be a prior art algorithm suitable for controlling a single coil BLDC motor, such as for example an algorithm which is controlling the BLDC motor based on the time derivative of the phase current as disclosed in EP3425788B1.

As the motor accelerates, the EHP reduces with every pulse train. Therefore, the number of pulses per pulse train reduces. If the number of pulses becomes too small, the error in timing estimation of the BEMF ZC may become more pronounced, making the control less good.

In embodiments of the present invention determining the parameters of the ongoing EHP comprises the detection of the end of the ingoing EHP. This may be switching to a next pulse train with inverted polarity, or switching to another method as soon as the BEMF is detected.

In embodiments of the present invention pulse train may be applied during the first part of the EHP, and as soon as BEMF is detected (for instance through phase current crossing the zero current threshold), another algorithm may be applied to complete the EHP in a more low noise method.

In that case the remaining part of the EHP may be realized as a fixed long pulse which may have wave shaping, such that this part is optimized for low noise operation. As the pulse train makes noise, in embodiments of the present invention pulses are not generated throughout the full EHP. Such hybrid methods take best of both worlds: pulse train to early detect BEMF (for fast LRP detection), or for closed loop BEMF ZC detection, and a low noise method to fill the remainder of the EHP. The BEMF ZC may be considered as a command to commute (i.e., invert polarity of the driving signal). This way a closed loop control of the motor is done.

Hybrid versions can be considered as well. For example, a pulse train may be used until BEMF is detected and the motor is not locked. From then onwards the EHP can be competed with a non-pulse train method to minimize noise. During the non-pulse train method the BEMF ZC may be predicted, for instance based on how fast the BEMW was detected, or based on previous pulse trains. In another example one may start with anon-pulse train wave to minimize the noise, and then in a predicted window start applying pulse trains for high resolution capturing of the ZC whilst maintaining forward torque in the motor.

In embodiments of the present invention a pulse train is only applied during a part of the EHP, in order to detect the BEMF zero crossing.

Figure 5:
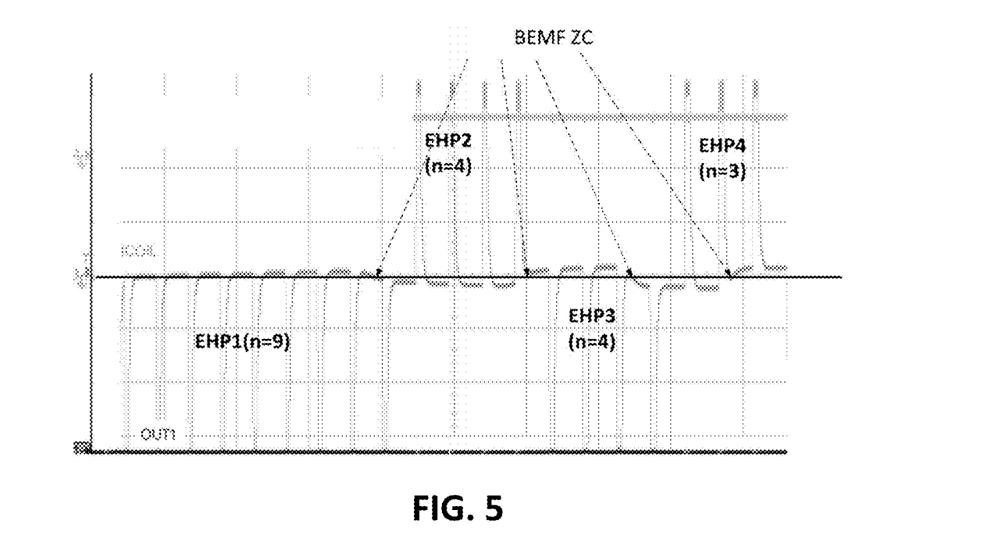
FIGS. 5 to 7 show scope plots of pulse sequences applied using a method or device in accordance with embodiments of the present invention.

In FIG. 5 four pulse trains, resulting from applying a method in accordance with embodiments of the present invention, are shown. The first pulse train comprises 9 pulses. In this example the recirculation period (RP) trecirc=20*τ0. The phase current goes into generator mode (Iphase<0) during recirculation already from the first pulse. The current comes out of generator mode in the 8th RP. In this implementation one more pulse is applied. In this 9th RP, the current is no longer going in recirculation.

The second pulse train comprises 4 pulses, of which the first three RP show negative phase current, and the 4th pulse no longer shows negative phase current. Therefore, the BEMF ZC occurred during the 4th TGP (torque generating period).

The third pulse train comprises 4 pulses, of which the first two RP show negative phase current, and in the 3rd RP the BEMF ZC is visible.

The fourth pulse train comprises 3 pulses, of which the first RP show negative phase current, and in the 2nd RP the BEMF ZC is visible.

Figure 6:
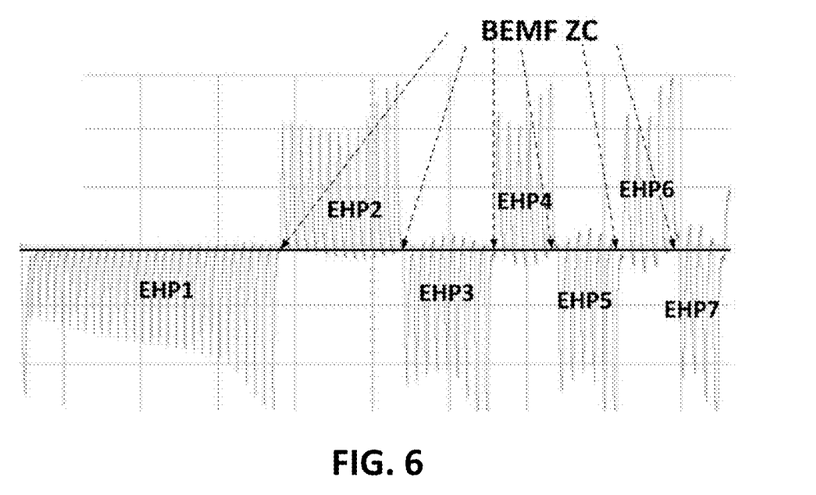

In FIG. 6 seven pulse trains are shown, realized on the same motor as in FIG. 3, however applying a fixed recirculation period trecirc=5*τ0.

The first pulse train comprises 33 pulses. During the approximately 20 first RP the recirculation current is not go negative yet during the RP. Then gradually the phase currents start to go negative. During the 33rd pulse the current no longer is negative, indicating the BEMF ZC has occurred. In this implementation example no extra pulse is applied after the BEMF ZC has occurred.

The second pulse train comprises 13 pulses. The recirculation current goes negative for the first 12 RP's. The 13th recirculation current no longer goes negative.

The third pulse train comprises 10 pulses. The recirculation current goes negative for the first 9 RP's. The 10th recirculation current no longer goes negative.

The fourth, fifth and sixth pulse train comprise 6 pulses, indicating the motor is no longer accelerating significantly anymore.

It can be noticed that this implementation offers a significantly higher resolution for the BEMF ZC detection compared to the method of FIG. 5. Also the torque is applied in a more evenly manner, while in FIG. 5 the stronger torque generating pulses are followed by longer periods of recirculation, during which the motor is braking, resulting in larger torque ripples.

During the first pulse train in FIG. 6 it is visible that the torque generating current is gradually increasing due to an increasing TGP. Towards the end of all the EHP the current peaks rise faster due to the additional influence from the reduction in tau(x). In the following EHP2/3/4/5/6/7 the increase in BEMF voltage largely compensates the increase in TGP.

Figure 7:
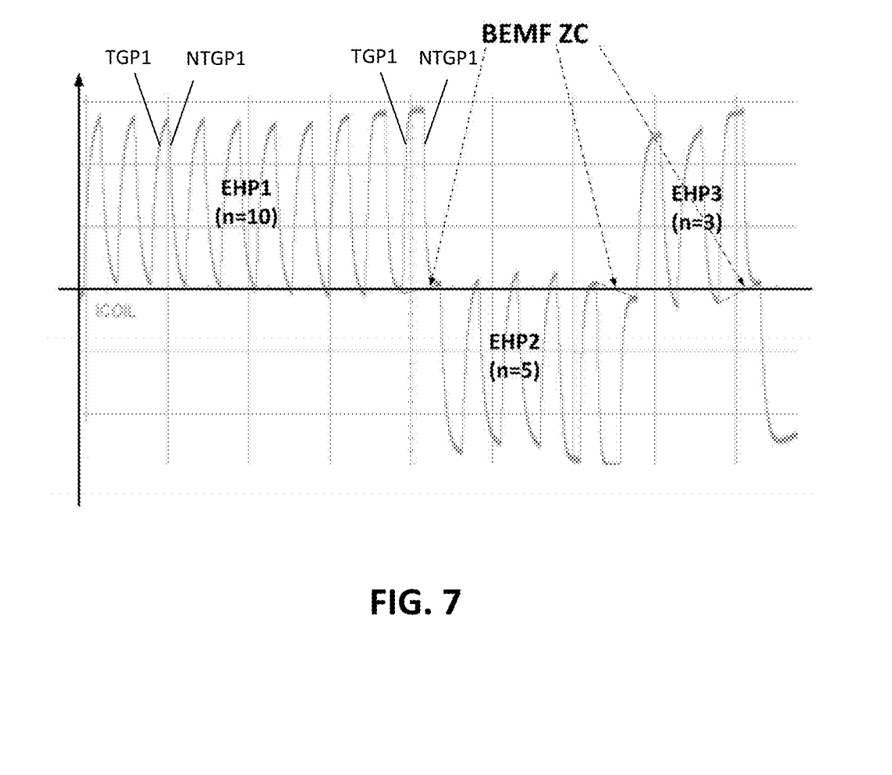

FIG. 7 shows another current trace obtained after applying a method in accordance with embodiments of the present invention on a single coil brushless DC motor, or when using a motor driver in accordance with embodiments of the present invention for driving a single coil BLDC motor. In this example the recirculation period is 5*τ0. The variation in inductance L(x) is clearly visible as the rise time reduces significantly close to the BEMF ZC location. This can for example be seen at the top of the last pulse of EHP1 which is almost flat. More in detail, early pulses in the EHP, such as for example the pulses indicated with TGP1 and NTGP1 in FIG. 7, show a slow rising/falling peak. There is no flattening in the current shape during TGP, or NTGP. Pulses closer to the BEMF ZC, such as for example pulses indicated with TGP2 and NTGP2 in FIG. 7, are fast rising. They show a very clear flattening in the current shape during TGP, and a less pronounced flattening during NTGP. Lines have been drawn which interpolate between the recirculation current peaks, to designate the BEMF ZC locations. This figure also shows clearly how the change in current rise- and fall time related to $\tau(x)$ can be used as phase current information.

In embodiments of the present invention information indicative of the change in electrical time constant ($\tau(x)$) may be used as phase current information.

As can be seen from FIG. 9, the minima of $\tau(x)$ on typical 1-coil motors coincide closely with the BEMF ZC position. The BEMF ZC position repeats every 180°. The zero torque point would be 0°. Due to the asymmetry in the magnetic design of the stator, a slight offset exists, due to which that $\tau 0=\tau(0)$ is not the minimum, but the minimum is slightly shifted.

In embodiments of the present invention information indicative of the change in electrical time constant ($\tau(x)$) may be obtained during the TGP, and/or during the NTGP. As can be seen in FIG. 6, the effect of variable $\tau(x)$ is most visible in the rising slope of the phase current during TGP (see for example the top of the last pulse of EHP6 which shows a flattening of the current shape during TGP). But can also be noticed in the falling slope during the subsequent RP (see for example the bottom of the last pulse of EHP6 which shows a flattening during NTGP). Actually this method allows to increase the sensing resolution by monitoring both the rising and/or the falling slope of the phase current. For instance, a steepness of the rising slope during TGP can be applied to reduce the following NTGP. This way the pulse train resolution can be optimized without detailed characterization of the motor, and without predicting the position inside the EHP.

In embodiments of the present invention the information indicative to the phase current at standstill may be used as absolute threshold. The indicative information related to $\tau(x)$ may be compared to the absolute threshold in order to ensure that τ0 is reached. As soon as τ(x) is approaching or dropping below τ0, this may be considered as indicative information of the presence of a BEMF ZC.

From the first pulse on the first pulse train, indicative information (e.g., τ0) for the electrical time constant can be retrieved from the phase current shape. τ0 may also be obtained through a test pulse.

As can be seen from FIG. 9, τ0 is in between the minimum τ(x) which is representative for the BEMF ZC position, and the maximum τ(x) which is representative for the middle of the EHP, and therefore this can be used as an indicative threshold to define an eminent BEMF ZC.

In embodiments of the present invention the information indicative to the phase current of previous driving pulses may be used as relative threshold. Either a reduction in τ(x) with a given % may be used, or a comparison proportional to a minimum of τ(x) which has been obtained during the ongoing EHP or the previous EHP may be made. In embodiments of the present invention the phase current slope information is used as information of the phase current.

In embodiments of the present invention the phase current peak information obtained during the TGP is used as indicative information. Next to analyzing the slope also the peak value of the current during the TGP can be used as indication of τ(x). In case the peak is clamped by current limiting, equivalent information can be obtained from the time how fast the current limit has been triggered.

Alternatively, a relative value can be tracked in which a reduction in τ(x) compared to the previous driving pulse, or compared to the minimum value detected in the ongoing or any previous EHP can be used as reference.

When analyzing phase current information during TGP, a method according to embodiments of the present invention may be configured to compensate for any variation in supply which may influence the indicative signal. Also, any wave shaping of the driving pulse during the TGP may be compensated in the analysis of the indicative signal. It may be beneficial to increase the pulse size as this makes it easier to measure the phase current information, which would be very challenging with state of the art integrated circuits if the rising and falling slopes were to be limited to for instance PWM ripples (<50 µs) which are at least one order smaller compared to electrical time constant signals (>100 µs).

In embodiments of the present invention the i may be proportionally large compared to the inertia. In that case the number of pulses in a pulse train may be limited. For example, only 2 pulses per pulse train may be possible from the first pulse, when using a threshold of zero current.

Figure 8:
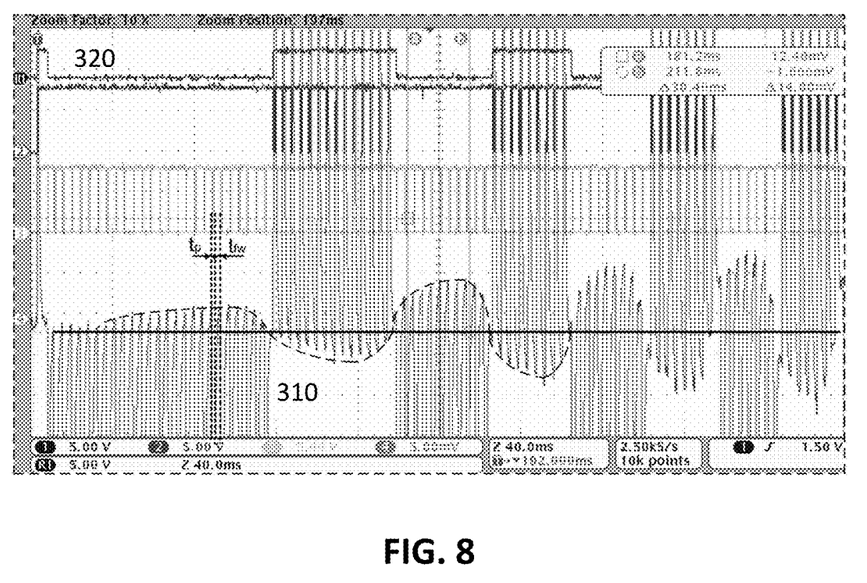
FIG. 8 shows oscilloscope traces of signals from a BLDC motor driven using a method or device in accordance with embodiments of the present invention.

FIG. 8 shows oscilloscope traces of signals from the BLDC motor. The bottom trace 310 shows the current. The top trace 320 show the output signal of a Hall sensor. This signal is not used for driving the motor but is shown in the scope image as reference only. From FIG. 8 it is visible, that the BEMF voltage can be reconstructed from the peaks of the recirculation current if enough peaks can be applied per pulse train (see the dashed line enveloping the current trace). As such the oncoming BEMF ZC may also be predicted, for instance as soon as the peaks start to reduce. As such in preferred implementations the pulses are kept as short as possible.

In FIG. 9 the measurement result of the electrical time constant τ(x) as function of the position of the rotor, expressed in electrical degrees, is shown. In this measurement setup, τ0=τ(0) is the time constant measured at stand still, at an ambient temperature of 25° C.

A device 200 according to embodiments of the present invention comprises a driver 210 configured for driving the single coil brushless DC motor according to a method of the present invention, a current monitoring module 220 configured for monitoring the phase current according to a method of the present invention, and the device 200 is configured for determining parameters for the ongoing EHP or for a next EHP sequence based on the obtained phase current information.

A current monitoring module 220, in accordance with embodiments of the present invention, is configured for obtaining phase current information during a sensing window. The sensing window is either during the TGP or the NTGP, and the sensing window lasts at least one electrical time constant (τ). In embodiments of the present invention the sensing window may be during the NTGP. In that case it may for example last until the phase current has reduced to less than half the maximum phase current which was generated during the torque generating period (TGP). The phase current information may be directly or indirectly the drain source voltage VDS voltage over one or both the FETs through which the current is recirculated, or through at least one shunt resistor which is applied in the freewheeling path, or any combination thereof.

The phase current information may be further digitized. The current monitoring module 220 may, therefore, comprise a comparator module that compares the current decay level between subsequent recirculation periods, or it may comprise an ADC with controller that compares the digitized output of the ADC between subsequent driving pulses.

In embodiments of the present invention the device 200 may be configured for determining parameters for the ongoing EHP or for a next EHP sequence based on the obtained phase current information. It may therefore comprise a controller which is configured for determining the parameters of the ongoing EHP, and/or of the at least one next EHP sequence based on the obtained phase current information.

In embodiments of the present invention the current monitoring module 220 is configured for comparing current during subsequent recirculation periods to a substantially zero current level.

Figure 10:
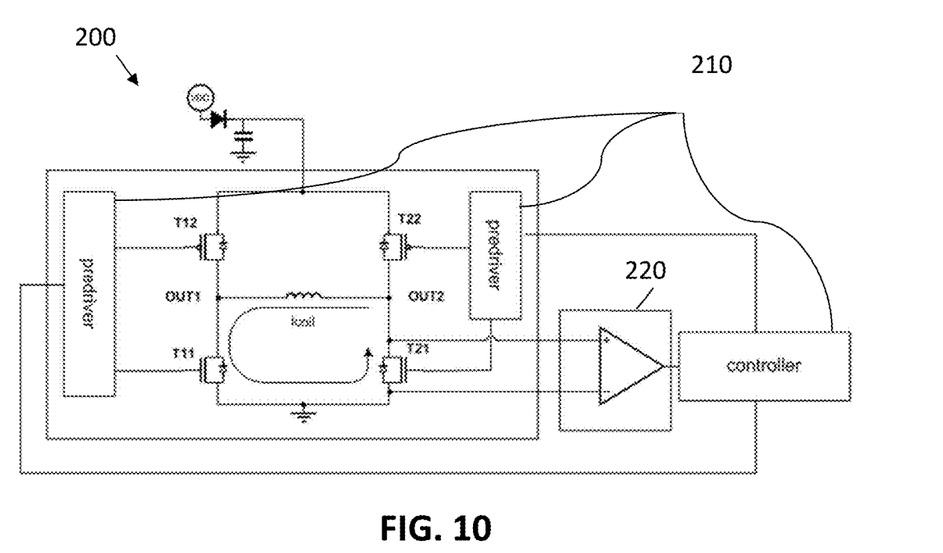
FIG. 10 shows a schematic drawing of a motor driver in accordance with embodiments of the present invention.

FIG. 10 shows a schematic drawing of a motor driver 200 in accordance with embodiments of the present invention. The driver 210 configured for driving the single coil brushless DC motor in accordance with a method according to any of the previous claims, comprises a controller for executing the method in accordance with embodiments of the present invention and a predriver for driving the gates of the transistors of the full bridge. The current monitoring module 220, in this example, is an amplified which amplifies the voltage over one of the transistors of the full bridge.

A method according to embodiments of the preset invention may be applied on, or a motor driver according to embodiments of the present invention may be used for driving, a single coil motor which has an asymmetrical stop position to ensure the motor does not stop at the zero torque position, and which has a preferred rotation direction, in which the zero torque position does not have to be crossed when starting up from the stop position.

Figure 11:
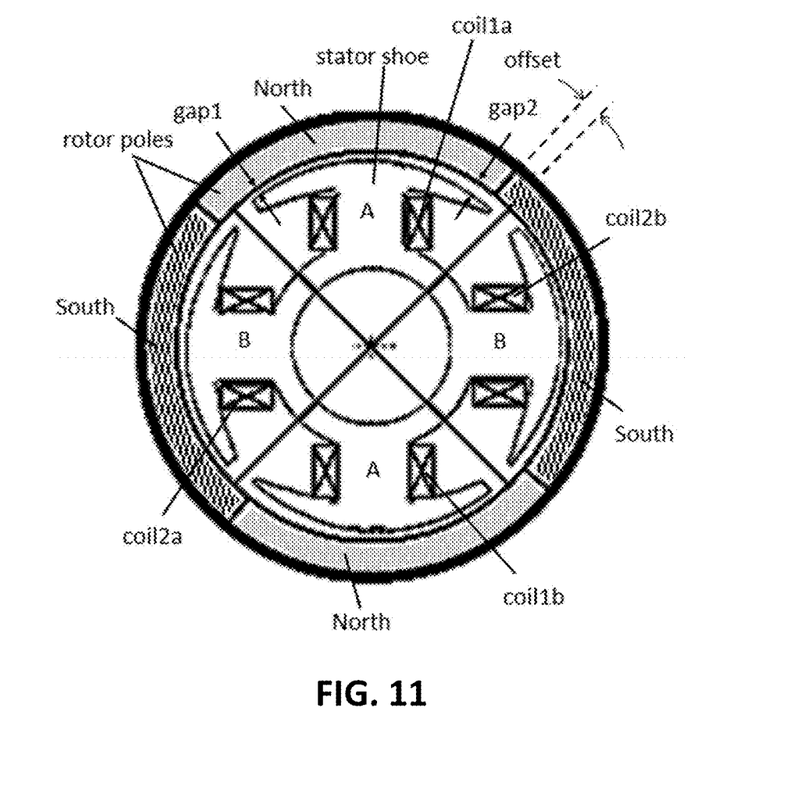
FIG. 11 shows a schematic drawing of a single coil motor with asymmetrical stop position which can be driven using a device or method in accordance with embodiments of the present invention.

An example of such a single coil motor with asymmetrical stop position is schematically illustrated in FIG. 11. In this example the preferred rotation direction is counterclockwise.

In embodiments of the present invention a start up in the preferred rotation direction is ensured by application of a pulse train, in which the first driving pulses which are applied during the first pulse train, have an initial average motor voltage which is sufficient to rotate the motor in the preferred rotation direction, but too low to jump over the zero torque point.

The applied start up torque may be defined by the interaction between the magnetic field strength of the rotor, and the current flowing through the electromagnet realized by the coil on the stator.

The benefit of the pulse train in which the current drops to less than half the peak current during TGP, and in particular when the current drops during NTPG to substantially zero, to realize such differential startup behavior is the fact that the torque pulses are interleaved, compared to other methods where a significant start up torque is applied which will allow to cross the zero torque position if the wrong polarity is applied at start up from stand still.

On the other hand the torque pulses have to be high enough, such that—in combination with the rotor+blade inertia—by the end of the first commutation, the next zero torque point can be crossed with sufficient speed. Else there is a risk that the rotor returns, and still starts up in the wrong direction.

Start up of the motor in the preferred direction may be achieved by a method in accordance with embodiments of the present invention wherein a pulse train sequence is initiated by applying a first voltage orientation on the first pulse train.

When after a predefined number of pulses, or a predefined LRP (locked Rotor Protetion) time, still no BEMF is detected during the RP, the pulse train sequence may be interrupted, and a new pulse train sequence may be initiated, with the opposite voltage orientation applied on the first pulse train.

In embodiments of the present invention, where current zero crossing is used to detect the present of BEMF, a time out can be applied after which—if still no current zero crossing has been detected—the pulse train can be initiated with opposite polarity.

In embodiments of the present invention the initial average motor voltage may be provided before initiating the pulse train sequence, internally stored (e.g. in EEPROM), by an external configuration using external passive components (e.g. resistors or capacitors), or may be provided through a communication interface.

In embodiments of the present invention the average motor voltage may be scanned or learned at start up. Such scanned or learned value may be stored subsequently in the EEPROM for use in next start up attempts. Such learning may be applied during end of line programming, or maybe repeated during application, such that for example effects which may increase initial friction can be taken into account, or effects such as change in environmental conditions (temperature, pressure, . . . ) or other variable load conditions.

In embodiments of the present invention calibration may be done based on a first predefined value which is provided before initiating the first pulse train sequence.

In embodiments of the present invention the average motor voltage applied on the pulses may be increased according to a predefined slope until an LRP time is reached.

In embodiments of the present invention a softstart may be applied. This is further explained when discussing FIG. 12.

In embodiments of the present invention the average motor voltage applied on the pulses is increased in subsequent start up attempts after a LRP time has been reached. Either the initial value is increased, or the slope is increased, or any combination thereof.

The average motor voltage may not be increased too drastically, for this may imply that the average motor voltage may become so high that the zero torque point can be overcome, and the motor may start in the opposite direction.

Figure 12:
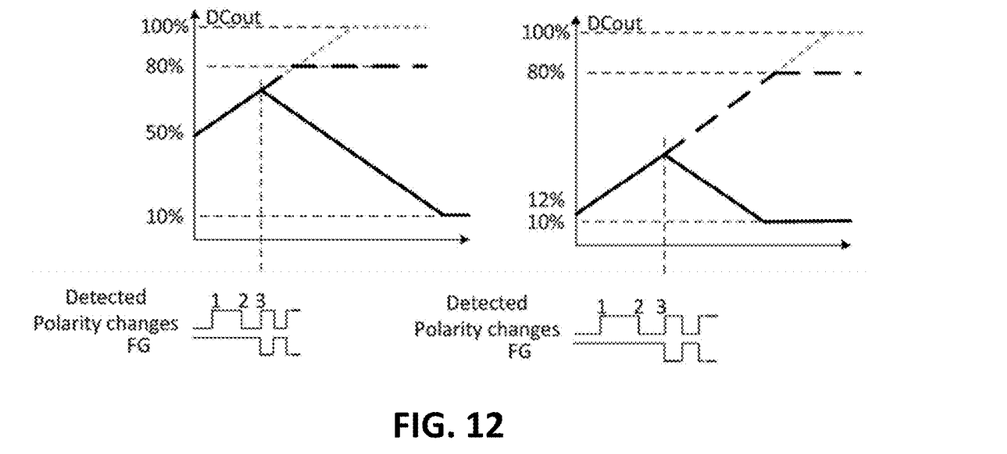
FIG. 12 illustrates the application of a softstart, which may be applied in embodiments of the present invention.

FIG. 12. Shows an example of softstart, in which the average motor voltage, represented as DCout*VDD is gradually increased from start up. DCout*VDD is the average output voltage when applying a driving voltage VDD with a certain duty cycle. In the left example starting from DCout=50%, in the right example starting from 12%. During the softstart the increase in DCout is predefined, for instance as 50%/sec, or as 12%/sec or as 100%/sec. As soon as a certain threshold or speed has been reached, another control loop may take over this duty cycle change rate in order to evolve towards the target speed. For example, average motor voltages of VDD*50% may be applied, which imply TGP NTGP. In most cases increasing to higher duty cycles will imply a significant reduction in resolution of the BEMF ZC detection.

Figure 13:
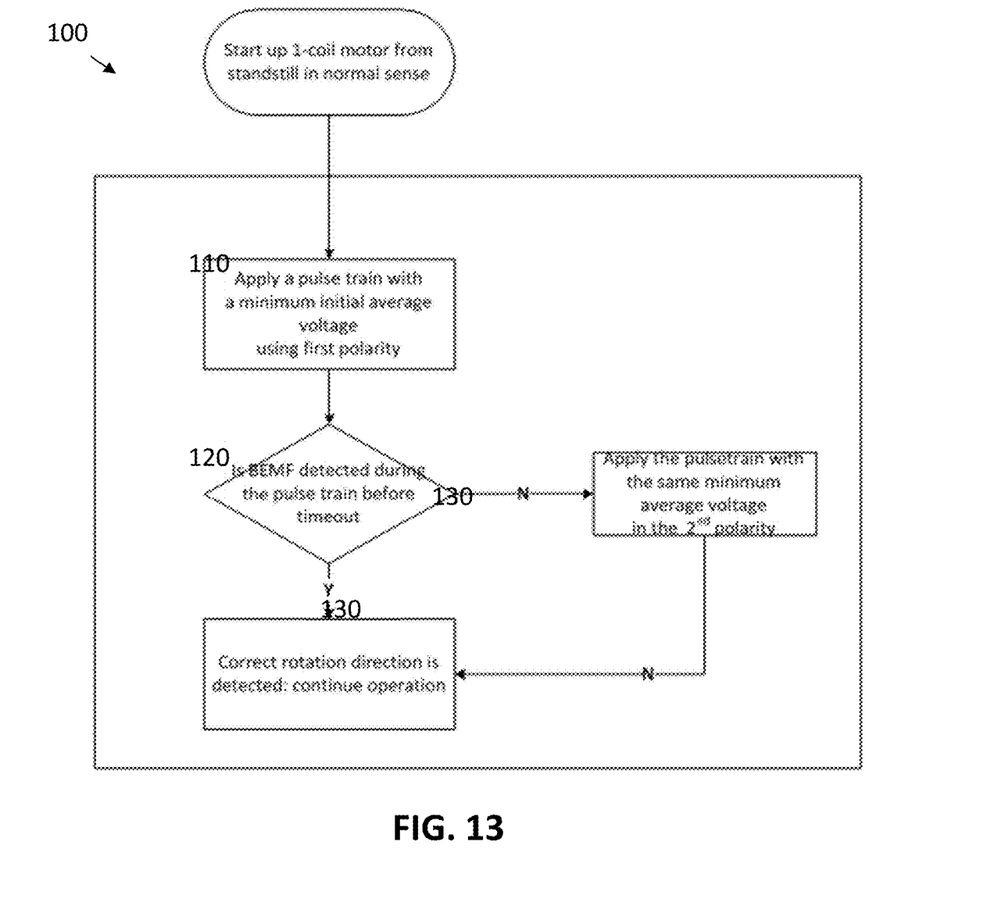
FIGS. 13 and 14 show flow charts of methods in accordance with embodiments of the present invention.

FIG. 13 shows a flow chart of a method in accordance with embodiments of the present invention. By the application of the applicable minimum initial average voltage the preferred rotation direction is ensured at start up, without need to know the actual position of the rotor.

Figure 14:
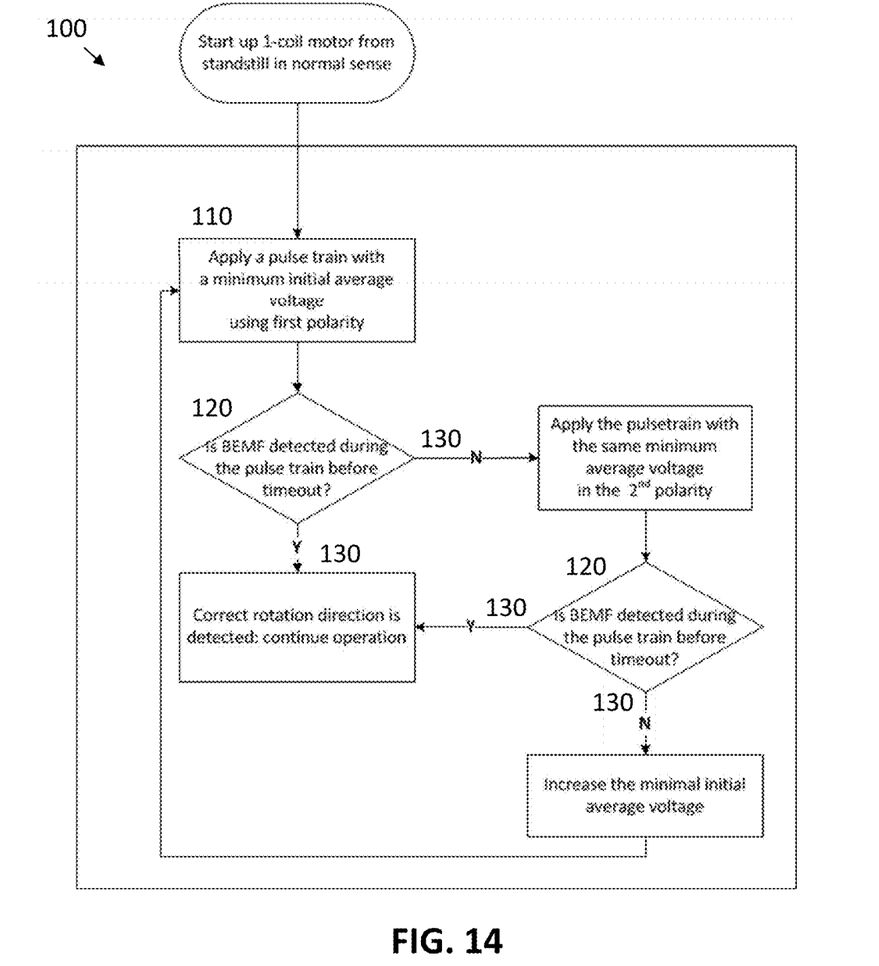

FIG. 14 shows a flowchart of a preferred implementation of a method in accordance with embodiments of the present invention. This method implies increasing the minimum initial average voltage, if no rotation was detected for both polarities.

In general, in methods according to embodiments of the present invention series of at least two pulses are applied each consisting of a Torque Generating Period (TGP), and a recirculation period (RP), in stead of applying a single driving wave form. Either the TGP or the RP can be considered as sensing period. The sensing window is at least one electrical time constant i of the combination motor, motor driver combination.

During the TGP the phase current is flowing through the coil such that a torque is applied which accelerates the rotor in the desired orientation by switching the full bridge, while during RP the full bridge is switched to recirculation mode, causing the torque generating current phase current is consumed, and/or eventually all torque generating phase current has been consumed, and any present BEMF voltage may induce generator mode current.

In first order the total resistance is defined by the motor coil resistance (Rcoil) augmented by the resistance of the bridge driver RDSon and an optional shunt resistor Rshunt. FIG. 2 illustrates a full bridge driver configuration of transistors T12, T21, T11, T22. The resistance of the bridge driver RDSon is equal to the resistance of (T12+T21) or (T11+T22). The inductance is defined by Lcoil.

In this example the electrical time constant i (of the single coil brushless DC motor, including driver) can be defined as Lcoil/(RDSon+Rcoil+Rshunt).

In second order wiring and PCD trace parasitic resistance and inductance values present between supply and ground may be considered as well. The electrical time constant i can then be calculated from the total inductance divided by the total resistance (of the single coil brushless DC motor, including driver). $\tau = Ltotal/Rtotal$.

Since Lcoil is depending on the position of the rotor versus the stator within one electrical half period (EHP), Ltotal0 is the total system inductance value measured when the rotor is stopped at the location defined by the motor cogging. For single coil motors the motor cogging is designed such that the rotor stops just next to the zero torque point, in the direction of the preferred start up direction.

$$\tau 0 = L\text{total}0/R\text{total}$$

Through monitoring the evolution of the phase current from alternating between TGP and RP information on the rotor state can be obtained.

In the below example the RP is considered as the sensing window, however similar implementation can be realized by using the TGP as sensing window.

The sequence of pulses each containing a TGP and an RP between two BEMF ZC's, and thus one EHP, is referred to as a pulse train. The behavior of the phase current is compared between subsequent sensing windows. In order to ensure at least two pulses within one EHP, $\tau 0$ should be proportionally smaller compared to the time needed for the at least first EHP. In case of 2 pulses the first sensing window must detect BEMF in the expected direction, and in the second window should not detect BEMF in the expected direction.

As more pulses can be applied per EHP, the resolution of the EHP time, and thus the motor speed information will become more accurate. Therefore it is an advantage of embodiments of the present invention that short pulses are applied. In the example where the RP is the sensing window, it is least $\tau 0$. The TGP preferably is as short as possible, whilst ensuring sufficient driving torque is generated to at least keep the motor moving in the desired direction.

In a preferred implementation according to this invention, the RP is long enough to ensure all torque generating current is fully consumed, and any present BEMF voltage will induce generator mode current. Such current zero crossing is easy to detect, and allows therefore an implementation which requires limited complexity.

The minimum motor coil inductance may be as much as 50% smaller compared to the maximum inductance (Lmax) inside one EHP. Therefore the RP must be sufficiently long such as to ensure the full torque generating current is consumed, and 3 or 4 electrical time constants $\tau 0$ may be insufficient. In implementations according to this invention, the RP may last until a current zero crossing is detected, in order to ensure shortest possible RP is applied without need to know the exact value of L at that point. Also, such adaptive methods can take advantage of increasing BEMF when the motor accelerates, as the increased BEMF will consume the phase current faster, and therefore reach the current zero crossing faster. A disadvantage of such adaptive methods, is that the resulting torque is not known in advance, which may lead to too fast acceleration. In other implementations according to this invention, RP may be fixed in advance, and then should be chosen large enough to allow a current zero crossing in all positions of the EHP.

The average motor voltage applied during a pulse must be strong enough to generate enough torque to substantially move the rotor. For doing so the applied duty cycle, and the duration of the TGP should be defined.

In implementations according to this invention, the length of the RP's may be further reduced by applying short reverse current pulses which accelerate the discharging of the phase current, therefore faster reaching an eventual current zero crossing. However such reverse current acts as a braking pulse, and may have to be compensated to ensure enough average motor voltage to ensure the motor to rotate in the desired direction. Such reverse current based methods may be particularly suited when $\tau\max$ (=Lmax/Rtotal) may be too large to allow two pulses to be applied within the first EHP.

In other implementations according to this invention, a pulse train is proposed in which RP is reduced such that no current zero crossing is reached, but a current threshold>0 is used. This is particularly interesting when the motor has accelerated enough and a strong BEMF voltage is already present. Since this corresponds to more elevated speeds, and thus shorter EHPs, the reduction in sensing window can be used to ensure the at least two pulses for higher motor speeds.

In such implementations, influences of supply variations, and from varying L as function of the rotor position inside the EHP must be taken into account. As the sensing window becomes shorter, the useful signal becomes weaker. The inventors established that the sensing window must be at least one $\tau 0$.

In implementations according to this invention, the single coil motor cogging is so strong that substantially more torque has to be applied to rotate the motor across the zero torque point compared to rotating in the preferred direction. Then the pulse train can be defined such that the motor voltage of the individual pulses is small enough such that the rotor will not move across the zero torque point, but is sufficient to start up in the desired direction. The fact that BEMF presence can be detected during the EHP ensures start up when applying the alternate voltage polarity to the first pulse train, if a first voltage polarity did not allow to rotate the motor within a time out time, referred to as Locked Rotor Protection (LRP) time.

In other implementations according to this invention, the applicable voltage polarity may be known prior to applying the first pulse train. Such methods are able to guarantee faster start-up, and are not limited in the application of the maximum torque. Such methods also allow applying a pulse train which has sufficient torque to jump over the zero-torque point, allowing bidirectional operation. Such pulse trains may have a leading strong pulse, with a high average motor voltage sufficient to overcome the zero torque point, followed by smaller pulses which offer highest sensing resolution.

In implementations according to this invention, the time constant $\tau 0$ may be known, or can be derived from available information. Such information may be stored in the EEPROM, or may be derived under use of external components, or may be provided via a digital or analog communication interface.

In implementations according to this invention, $\tau 0$ may also be measured while the motor is standing still, or as part of the first pulses, presuming the motor is substantially standing still and any influence from eventual BEMF voltage may be neglected. In such implementations the motor driver may apply a test probe signal and derive from the test probe signal the motor electrical characteristics (Lcoil and Rtotal). Such methods are well known for the skilled people in the art, and may be based on applying a voltage or forcing a current on the motor coil using the H-bridge driver, and measuring the resulting current, respectively voltage evolution as a step response and/or a phase shift.

Since typical electrical time constants $\tau 0$ are in the range from less than 50 µs to few ms, sensing windows may range from less than 100 µs up to 10 ms.

In a typical fan with $\tau 0=330$ µs, and a sensing window=$3*\tau 0=1$ ms, the pulse train will cause audible noise at 1 kHz, to which the human ear is sensitive.

Therefore, the pulse train power level is preferably limited, either by limiting the duration of the pulse train before switching to a more low noise method, or by applying a lower energy level per single driving pulse. For motors with more than 5 W, low average motor voltages as low as 1% to 10% of the supply voltage are sufficient to accelerate the motor from stand still in few 100 ms, and obtain suitable speed information to transition to other more low noise methods. For motors less than 5 W higher motor voltages up to 50% can be applied with similar soft start sequences as applied in state of the art statemachine based fandrivers.

To further reduce the noise, the pulse train method according to embodiments of the present invention can be applied as a robust method which can obtain inertia information of the driving motor occasionally by calibration or teaching. A method in accordance with embodiments of the present invention may be applied in case of a locked rotor protection (LRP) event.

As discussed, a method in accordance with embodiments of the present invention may be configured to obtain inertia information of the motor. The obtained inertia information can be used when switching to another more method which requires such inertia information. After such learning cycle, the inertia information can be stored in internal memory and applied when switching to another method (e.g., a lower-noise method). A new calibration may be done when a new LRP condition occurs for instance due to changing ambient temperature, or wear of the bearing, or changing external load condition.

In embodiments of the present invention the average motor voltage may be gradually increasing throughout the pulse trains, such as to realize a low noise acceleration to a desired motor voltage suitable to transition to a different sensorless driving method. For instance, increasing the average motor voltage from 1% to 5% of the supply voltage, or from 12% to 25% onwards, or from 1% to 75% at a rate of for instance 50%/sec or 100%/sec inside the driving periods. Mind that increasing the average motor voltages results in increasing pulse lengths, and thus will impact the resolution of the BEMF ZC detection. Especially for average motor voltages larger than 50% of the supply voltage the impact on the length of the pulses might be significant.

In embodiments of the present invention a soft start approach allows on one hand to start up with limited inrush current, which puts a high stress on the coil, and causes audible noise, whilst on the other hand ensuring a wide enough torque range, ensuring enough torque to start up very wide variety of motors, with a wide variety of inertia, even without prior knowledge of the load condition of the attached fan/pump.

In embodiments of the present invention, TGP may be used as the sensing window. Since the BEMF at start up can be neglected compared to the VDD, the phase current Iphase(t) in function of time is defined by the electrical time constant $\tau(t)$ in function of time. Since the minimum of the electrical time constant $\tau$min is located near the BEMF ZC, the evolution of $\tau$ can be used to predict the BEMF ZC. In such case the rise time is evaluated during TGP as an indication of the presence of the BEMF ZC.

In preferred implementations according to this invention, the average motor voltage is fixed during the TGP, and the current is allowed to decay during the NTGP, such that the current at the start of the TGP is similar for every subsequent pulse within one pulse train. A sudden increase in rise time indicates the presence of the commutation point. Such method is particularly suited for motors with high ratio $\tau$max/$\tau$min.

The invention claimed is:

1. A method for controlling a single coil brushless DC motor having an electrical time constant, the method comprising EHP sequences which comprise a pulse train which comprises at least two driving pulses of a same polarity, in which each driving pulse comprises:
    applying a driving signal during a torque generating period (TGP), to increase a phase current, followed by a non-torque generating period (NTGP), during which the phase current is reducing,
    monitoring the phase current during a sensing window thereby obtaining phase current information, wherein the sensing window lasts at least during a time constant, which is the electrical time constant or an approximation of the electrical time constant, if the sensing window is during the TGP, and wherein the sensing window minimally lasts until the phase current has reduced to less than half the maximum phase current which was generated during the TGP if the sensing window is during the NTGP,
    and determining parameters for the ongoing EHP, and/or for at least one next EHP sequence based on the obtained phase current information by using a slope or a peak value of the phase current during the TGP if the sensing window is during the TGP, or in which the sensing window is during the NTGP and in which the NTGP comprises a recirculation period wherein during at least one recirculation period the phase current decays below a predefined current threshold, and as soon as one driving pulse with a recirculating phase current below the predefined threshold is detected, the determining step comprises determining the at least one next driving pulse in which the phase current is no longer dropping below the predefined threshold.

2. The method according to claim 1, wherein the pulse train comprises at least 3 pulses.

3. The method according to claim 1, wherein the pulse train of a first EHP sequence of the EHP sequences is initiated while the motor is standing still.

4. The method according to claim 1, wherein the determining step comprises comparing a shape of the obtained phase current information of subsequent sensing windows.

5. The method according to claim 1, in which the driving signal during the TGP is a driving voltage wave form which is defined by a permanent high signal or has a predefined shape.

6. The method according to claim 1, in which an average motor voltage in subsequent driving pulses is gradually increased.

7. The method according to claim 1, in which the NTGP comprises a recirculation period.

8. The method according to claim 1, in which the time constant is defined in function of a certain electrical position of a rotor, prior to the application of the pulse train of a first EHP sequence of the EHP sequences.

9. The method according to claim 1, in which the sensing window is during the NTGP, and in which the NTGP comprises a recirculation period and in which the recirculation period is interrupted a predefined time after the phase current information has been obtained, and is limited by a predefined timeout value which is proportional to the time constant, in case no negative phase current is detected within this timeout value.

10. The method according to claim 1, wherein determining parameters for the ongoing EHP sequence comprises defining an end of the ongoing EHP.

11. The method according to claim 10, wherein the end of the ongoing EHP is defined by initiating a next pulse train with the opposite polarity.

12. The method according to claim 1, wherein determining the parameters of the ongoing EHP comprises switching to another method as soon the BEMF is detected.

13. The method according to claim 1, in which a pulse train is only applied during a part of the EHP, in order to detect the BEMF zero crossing.

14. A method for controlling a single coil brushless DC motor having an electrical time constant, the method comprising EHP sequences which comprise a pulse train which comprises at least two driving pulses of a same polarity, in which each driving pulse comprises:
applying a driving signal during a torque generating period (TGP), to increase a phase current, followed by a non-torque generating period (NTGP), during which the phase current is reducing,
monitoring the phase current during a sensing window thereby obtaining phase current information, wherein the sensing window lasts at least during a time constant, which is the electrical time constant or an approximation of the electrical time constant, if the sensing window is during the TGP, and wherein the sensing window minimally lasts until the phase current has reduced to less than half the maximum phase current which was generated during the TGP if the sensing window is during the NTGP,
and determining parameters for the ongoing EHP, and/or for at least one next EHP sequence based on the obtained phase current information,
wherein the sensing window is during the NTGP, and where the NTGP comprises a recirculation period wherein during at least one recirculation period the phase current decays below a predefined current threshold, and
as soon as one driving pulse with a recirculating phase current below the predefined threshold is detected, the determining step comprises determining the at least one next driving pulse in which the phase current is no longer dropping below the predefined threshold.

15. The method according to claim 14, wherein the predefined current threshold is substantially zero.

16. A method for controlling a single coil brushless DC motor having an electrical time constant, the method comprising EHP sequences which comprise a pulse train which comprises at least two driving pulses of a same polarity, in which each driving pulse comprises:
applying a driving signal during a torque generating period (TGP), to increase a phase current, followed by a non-torque generating period (NTGP), during which the phase current is reducing,
monitoring the phase current during a sensing window thereby obtaining phase current information, wherein the sensing window lasts at least during a time constant, which is the electrical time constant or an approximation of the electrical time constant, if the sensing window is during the TGP, and wherein the sensing window minimally lasts until the phase current has reduced to less than half the maximum phase current which was generated during the TGP if the sensing window is during the NTGP,
and determining parameters for the ongoing EHP, and/or for at least one next EHP sequence based on the obtained phase current information,
wherein the sensing window is during the TGP and wherein the determining step comprises determining parameters for the ongoing EHP, and/or for at least one next EHP sequence based on the obtained phase current information by using a slope or a peak value of the phase current during the TGP.

\* \* \* \* \*